United States Patent
Sparks et al.

(10) Patent No.: US 7,855,786 B2
(45) Date of Patent: Dec. 21, 2010

(54) SINGLE CAMERA MULTI-SPECTRAL IMAGER

(75) Inventors: Andrew W. Sparks, Honolulu, HI (US); Michael J. DeWeert, Kailua, HI (US)

(73) Assignee: BAE Systems Spectral Solutions LLC, Honolulu, HI (US)

( * ) Notice: Subject to any disclaimer, the term of this patent is extended or adjusted under 35 U.S.C. 154(b) by 0 days.

(21) Appl. No.: 11/327,417

(22) Filed: Jan. 9, 2006

(65) Prior Publication Data

US 2007/0159541 A1 Jul. 12, 2007

(51) Int. Cl.
G01N 21/25 (2006.01)
(52) U.S. Cl. ...................................... 356/419
(58) Field of Classification Search ................ 356/419; 358/518; 250/332, 208.1, 226; 257/98
See application file for complete search history.

(56) References Cited

U.S. PATENT DOCUMENTS 5,479,015 A * 12/1995 Rudman et al. ............. 250/332
2003/0038296 A1 * 2/2003 Merrill ........................ 257/98
2005/0219660 A1 * 10/2005 Atsumi et al. ............... 358/518

\* cited by examiner

Primary Examiner—Tarifur Chowdhury
Assistant Examiner—Abdullahi Nur
(74) Attorney, Agent, or Firm—Bingham McCutchen LLP; Robert C. Bertin

(57) ABSTRACT

An imaging system has a single focal plane array that does not require the precise alignment of multiple cameras relative to one another. It incorporates a multi-band, band pass filter that includes filter elements corresponding to pixel regions of a detector within a camera. The imaging system may further incorporate a detector that vertically discriminates among radiation in different spectral bands incident on an image plane of the detector. In this manner, spectral content may be determined in each spatial region without the need for beam splitting or multiple cameras. The filter itself may further comprise different filter elements, for example, filter elements A and B arranged in a checkerboard pattern, where filter element A passes different spectral bands than filter element B. In this manner, multi-spectral, high resolution images may be generated using a single camera that significantly improves upon image discrimination as compared to, for example, the Bayer color filter array pattern. The single camera implementation is well suited for incorporation into marine, land and air vehicles.

12 Claims, 6 Drawing Sheets

SINGLE CAMERA MULTI-SPECTRAL IMAGER

FIELD OF THE INVENTION

The present invention relates generally to imaging and, more particularly, to an imaging apparatus having a single focal plane array that provides three or more bands of multi-spectral data.

BACKGROUND OF THE INVENTION

Imaging and the detection and classification of objects is an important aspect of the operation of many systems, including satellite systems, marine vehicles, land based vehicles and aircraft. Imaging systems may be used to capture light within visual spectrum and reproduce in the visual spectrum a rendition of the image captured by one or more cameras. They may also be used to collect signals outside of the visual spectrum, which may be reproduced or conveyed as an image in the visual spectrum to provide information to people about a target, scene or environment. Imaging systems may also be used to perform detection or classification without necessarily having to reproduce an image.

Imaging systems generally include a camera that captures incoming light radiation and outputs signals or data in the form of an array of pixels. Each pixel in the array represents a portion of the image received by the camera and generally is defined by its pixel location, and color information, including the intensity of each color that comprises the pixel. In RGB imaging, the color information includes intensity data corresponding to the red, green and blue colors. The pixel data is stored and then may be used to reproduce a color image in the visual spectrum. Many consumer digital cameras and video cameras operate using the RGB pixel format.

A problem with all imaging systems is that scenes and targets of interest are frequently cluttered with glint, reflections or physical obstacles to a clear view. The imperfections in such scenes as perceived by the eye in the visual spectrum are reproduced in images rendered by RGB imaging systems. However, undesirable glint, reflections and in some cases physical objects may be filtered out of images captured by imaging systems using various well known techniques to process pixel data. Another technique to improve an image is to collect and process spectral information from more than three bands using more cameras. The additional spectral information associated with the additional bands beyond three bands is used to make a better, combined image, or to use the information from the additional bands to improve the ability to detect or classify objects captured by the imaging system.

Another problem of imaging systems is that while more cameras lead to more accuracy, they also lead to increase size and cost. For example, in multiple camera imaging systems, precise alignment and rigid mounting of the cameras is required to keep the cameras properly focused on the same field of view. The alignment and mounting is expensive and time consuming. The rigidity requirements also add size and weight that may be unacceptable for many applications. For vehicle applications of multiple camera imaging systems, the inevitable jarring and vibration may be detrimental to the camera alignment and the performance of the imaging system over time causing the need for periodic realignment and adjustment.

Accordingly, there remains a need for an imaging system that is capable of collecting more than three spectral bands with a minimum number of cameras. There is a further need for an imaging system that is capable of collecting more than three spectral bands that is compact, relatively inexpensive and that does not require elaborate alignment or include heavy mounting components.

SUMMARY OF THE INVENTION

According to the present invention, an imaging system may be implemented having a single focal plane array that does not require the precise alignment of multiple cameras relative to one another. The imaging system incorporates a multi-band, band pass filter that includes filter elements corresponding to pixel regions of a detector within a camera. The imaging system may further incorporate a detector that vertically discriminates among radiation in different spectral bands incident on an image plane of the detector. In this manner, spectral content may be determined in each spatial region without the need for beam splitting or multiple cameras. The filter itself may further comprise different filter elements, for example, filter elements A and B arranged in a checkerboard pattern, where filter element A passes different spectral bands than filter element B. In this manner, multi-spectral, high resolution images may be generated using a single camera that significantly improves upon image discrimination as compared to, for example, the Bayer color filter array pattern. The single camera implementation is well suited for incorporation into marine, land and air vehicles.

According to one embodiment of the present invention, an imaging system includes a camera and a multi-band, band pass filter. The camera includes a detector having an image plane and photosensing layers beneath the image plane, different layers corresponding to different bands. The filter filters radiation received from a target and optically conveys it to the image plane and includes at least some filter elements that have more than two bands. The filter elements themselves each convey radiation to an associated pixel region of the image plane. The filter elements may comprise at least two different types of filter elements, each transmitting different bands to the image plane. Moreover, the different types of filter elements may be arranged in a checkerboard pattern on the filter. In a preferred embodiment, the filter includes two different type of filter elements, each transmitting three substantially non-overlapping spectral bands. The imaging system may further include a lens between the filter and the camera that conveys the image from the filter to the image plane.

According to another embodiment of the present invention, a multi-band, band pass filter comprises a plurality of filter elements, each corresponding to at least one pixel region on an image plane of a detector. The filter may be, for example, a multi-layer dielectric filter.

BRIEF DESCRIPTION OF THE FIGURES

The above described features and advantages of embodiments of the present invention will be more fully appreciated with reference to the detailed description and figures, in which.

DETAILED DESCRIPTION

As described in detail below, an imaging system may be implemented having a single focal plane array that does not require the precise alignment of multiple cameras relative to one another. The imaging system incorporates a multi-band, band pass filter that includes filter elements corresponding to pixel regions of a detector within a camera. The imaging system may further incorporate a detector that vertically discriminates among radiation in different spectral bands incident on an image plane of the detector. In this manner, spectral content may be determined in each spatial region without the need for beam splitting or multiple cameras. The filter itself may further comprise different filter elements, for example, filter elements A and B arranged in a checkerboard pattern, where filter element A passes different spectral bands than filter element B. In this manner, multi-spectral, high resolution images may be generated using a single camera that significantly improves upon image discrimination as compared to, for example, the Bayer color filter array pattern. The single camera implementation is well suited for incorporation into marine, land and air vehicles.

Figure 1:
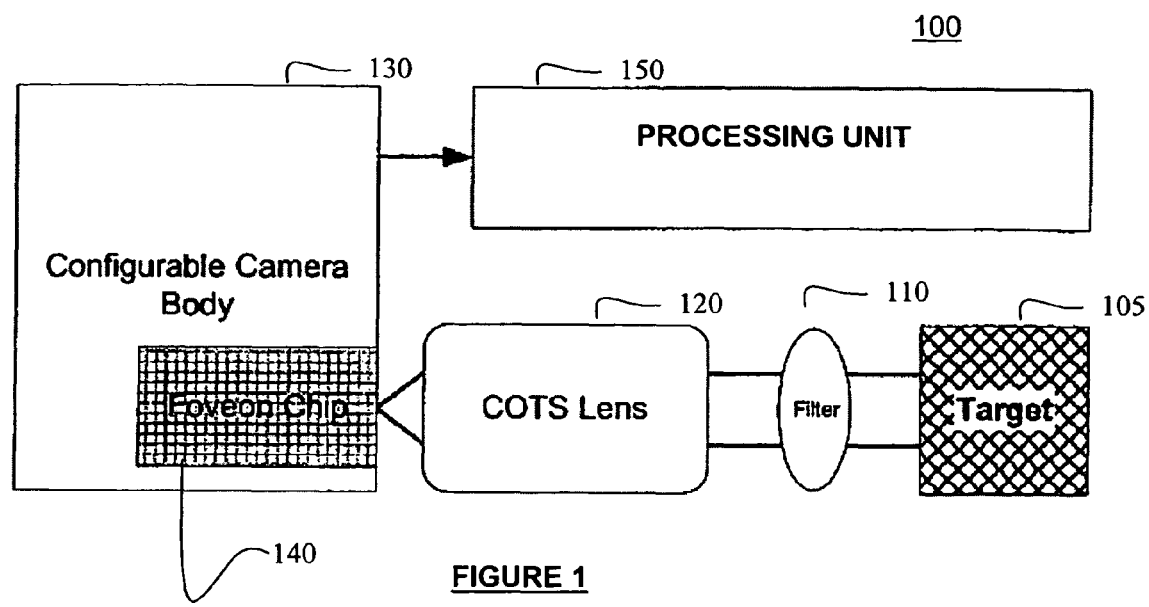
FIG. 1 depicts a block diagram of an imaging system according to an embodiment of the present invention.

FIG. 1 depicts a block diagram of an imaging system 100 according to an embodiment of the present invention. Referring to FIG. 1, the imaging system 100 is a single camera, multi-spectral optical system that includes a filter 110, a lens 120, a camera 130 including a detector chip 140 and a processing unit 150. The imaging system 100 may be pointed at a target 105 and receives electromagnetic radiation from the target, which passes optically through the filter 110, the lens 120 and onto the detector 140 within the camera 130.

Figure 2:
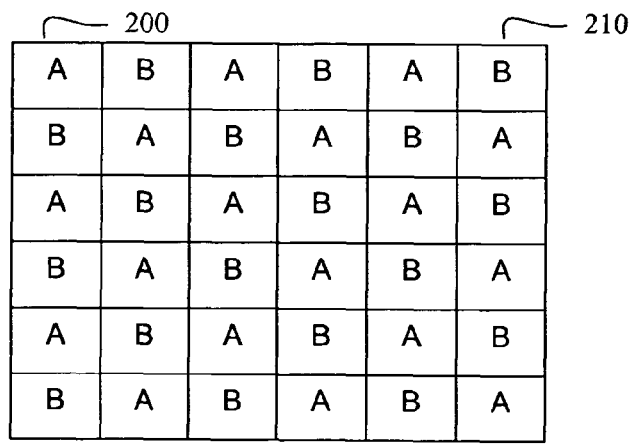
FIG. 2 depicts an illustrative multi-band, band pass filter having filter elements arranged in a checkerboard pattern according to an embodiment of the present invention.

The filter 110 may be a multiple bandpass filter. According to the present invention, the filter 110 is configured to pass more than three bands. According to one embodiment of the invention, the filter passes six different bands and includes two different types of filter elements that are arranged in a checkerboard pattern as shown in FIG. 2. Filter elements 200, designated A in FIG. 2, are triple pass filters that preferentially pass radiation in three different bands. Filter elements 210, designated B in FIG. 2, are also triple pass filters that preferentially pass radiation in three different bands. However, the bands passed by filter A and filter B are different, thus providing a total of six bands of radiation from the target 105 to the camera 140. It will be understood that this configuration is merely one embodiment of the present invention. For example, Filters A and B could pass 2, 4 or more bands each. Moreover, filters A and B do not necessarily need to pass the same number of bands each and there could be other types of filter elements, for example, filter elements C or D in the pattern. In general, however, filter elements are aligned optically relative to the lens 120 and the detector 140 so that the each filter element A or B conveys filtered radiation from the target 105 to at least one corresponding pixel on the detector 140.

Figure 7:
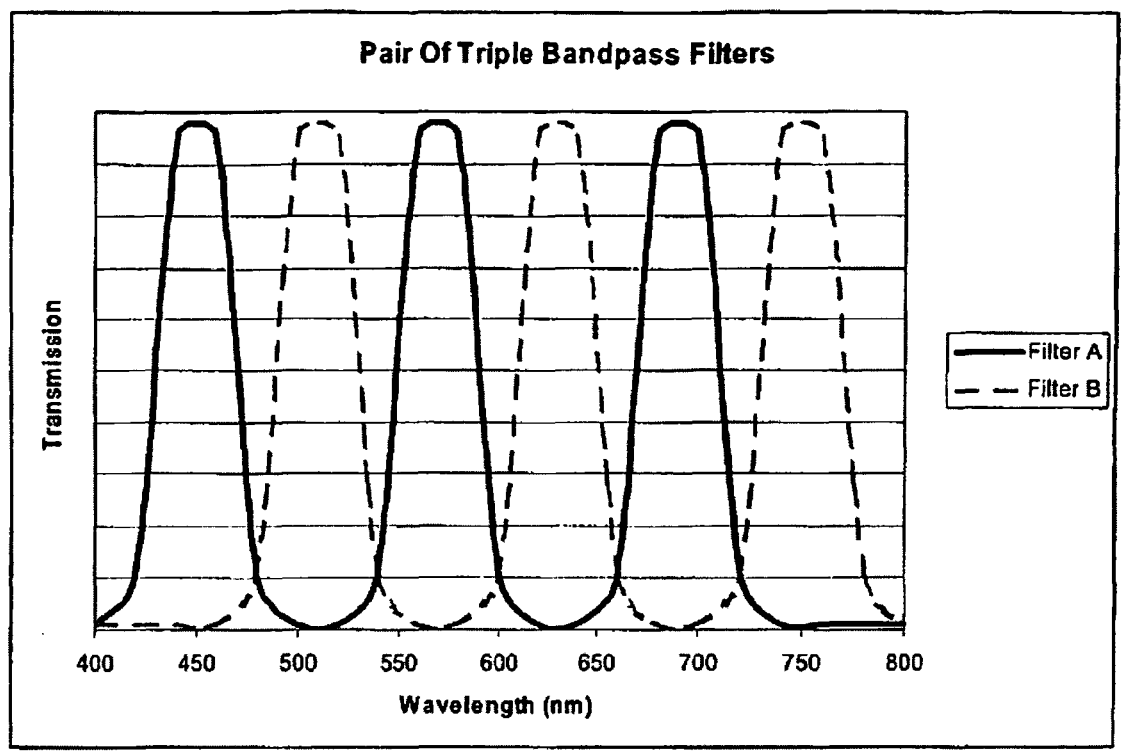
FIG. 7 depicts an illustrative embodiment of a pair of triple bandpass filters that may be implemented according to embodiments of the present invention.

For a six band, single camera imager, FIG. 7 is a chart showing illustrative characteristics for three band filter elements A and B. Filter element A is shown to have three transmission peaks respectively centered at radiation having wavelengths of approximately 450 nm, 575 nm and 700 nm. Filter element B is shown to have three transmission peaks respectively centered at radiation having wavelengths of approximately 515 nm, 640 nm and 765 nm. The transmission characteristics and peaks of filter element A and B are shown to be such that wavelengths of light that fall within about 10 nm of each peak are transmitted well by each filter element. Wavelenghts of light that fall outside of a peak by more than about 10 nm are significantly attenuated by the filter element. In this manner, the filter elements A and B may pass substantially non-overlapping bands of radiation according to an embodiment of the present invention.

Figure 3:
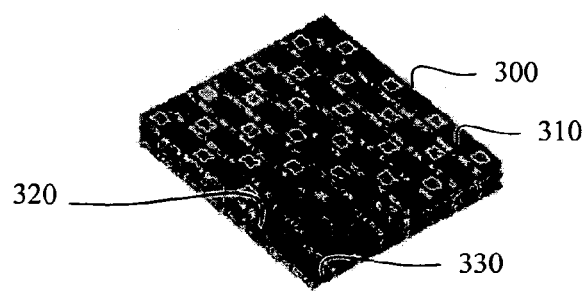
FIG. 3 depicts an integrated detector and multi-band, band pass filter having filter elements arranged in a checkerboard pattern according to an embodiment of the present invention.

The filter 110 may be implemented using any technology that permits multiple bandpass filter elements to be constructed in a checkerboard pattern as shown in FIG. 2 with each filter element corresponding to one or more pixels. This may be done using any convenient filters depending on the dimensions and size requirements for the imaging system. One example is a multi layer dielectric filter. Another example is a dichroic filter such as disclosed in U.S. Pat. No. 6,638,668, hereby incorporated by reference herein, which discloses a process of method of making a patterned filter array. Such a filter array may be implemented on the detector 140 within the camera. U.S. Pat. No. 6,638,668 discloses a process of depositing a filter array on a semiconductor that may be used to make a monolithic detector that integrates the lens and filter as described herein. Such an approach is illustratively shown in FIG. 3, which shows a filter layer 300 on top of a blue pixel layer 310, a green pixel layer 320 and an red pixel layer 330. The filter 110 may alternatively be implemented as a stand alone optical device in the optical path between the target 105 and the camera 130. At least one of the filter elements is a multi band filter elements according to an embodiments of the present invention.

The lens 120 is positioned in the optical path between the filter and the detector 140 within the camera. When the filter 110 is implemented as a stand alone filter device, the lens 120 may be any type of lens capable of conveying light between the filter and the operative optical plane of the detector. The lens may be used to focus, collimate and/or direct a beam from the target to the operative optical plane of the detector. Alternatively, the lens may comprise a lens array in which each lens element conveys light associated with a pixel or groups of pixels to a predetermined portion of the detector. In a monolithic implementation, such as that shown in FIG. 3, the lens may be integrated into a semiconductor layer between the filter layers and the detector layers. In other applications, including monolithic implementations, a lens may be unnecessary.

The camera 130 is positioned in the optical path and is aligned such that radiation from the target passes through the filter and lens and impinges upon the operative plane of the detector 140. The detector 140 within the camera 130 receives the filtered radiation and outputs electrical signals on a pixel-by-pixel basis corresponding to the intensity of light received at each optical band that the detector is designed to measure. These signals are then converted into pixel data in a well known manner. The detector 140 may be implemented using any technology that creates signals from which pixel data can be created, including but not limited to photodiodes, charge coupled devices (CCD) and photocurrent sensors.

Figure 4:
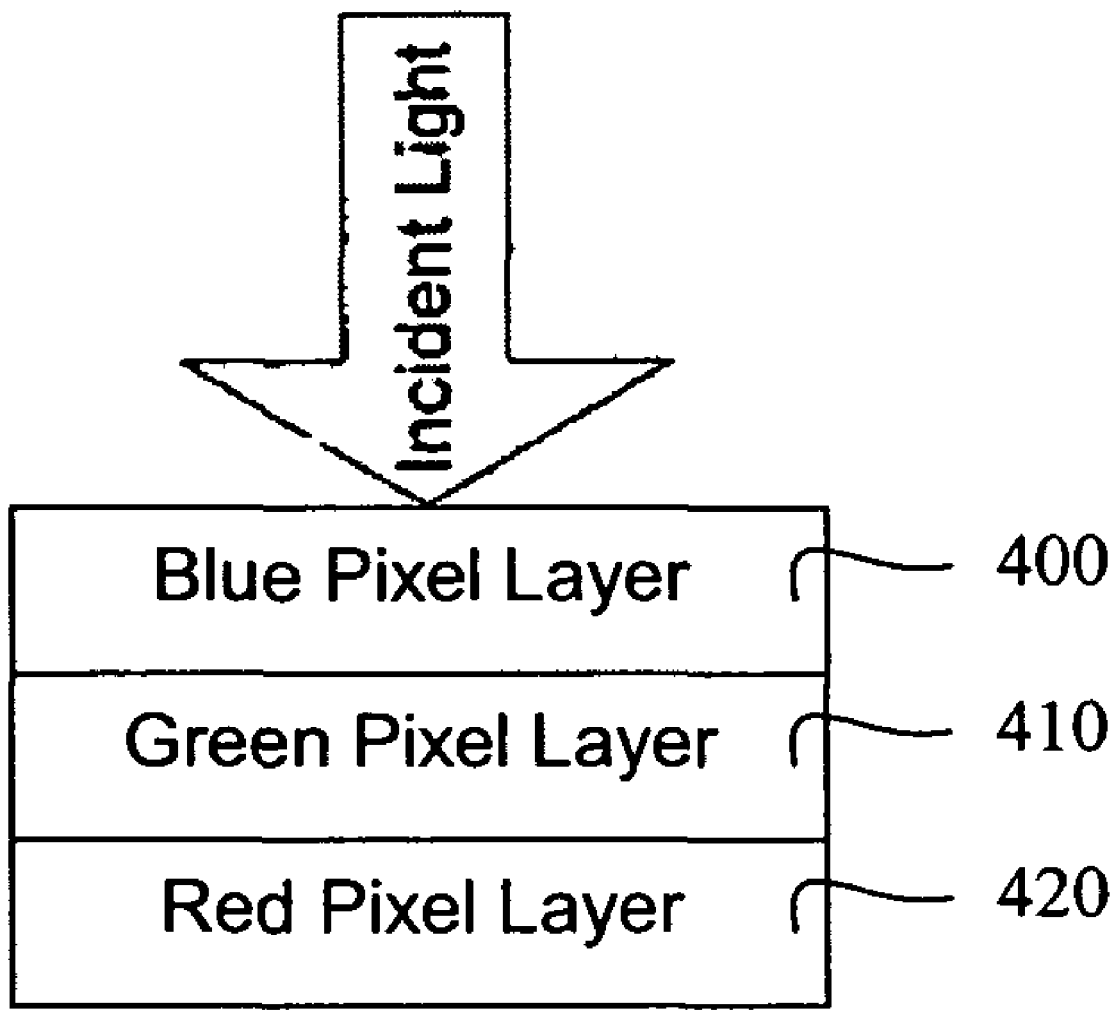
FIG. 4 depicts a structural representation of a multilayer CMOS photodiode array element which may be implemented in an imaging system according to an embodiment of the present invention.

According to one embodiment of the present invention, the detector 140 within the camera may be implemented using a photosensing structure that receives light at a pixel location on the plane of the detector and vertically extracts signals corresponding to the intensity of light at different wavelengths. FIG. 4 illustratively depicts a semiconductor structure that receives light at its operative detector surface and extracts produces signals corresponding to the intensity of light at red, green and blue wavelengths that may be converted to pixel data. U.S. Pat. No. 5,965,875 depicts a photosensing structure as described above, implemented in CMOS technology, and as illustratively shown in FIG. 4. A chip with these characteristics is commercially available from Foveon corporation. Referring to FIG. 4, the radiation received from the target impinges on three vertically stacked semiconductor layers, the blue pixel layer 400, the green pixel layer 410 and the red pixel layer 420. Electrical signals are produced by each layer that correspond to the intensity of red, green and blue light.

Figure 5:
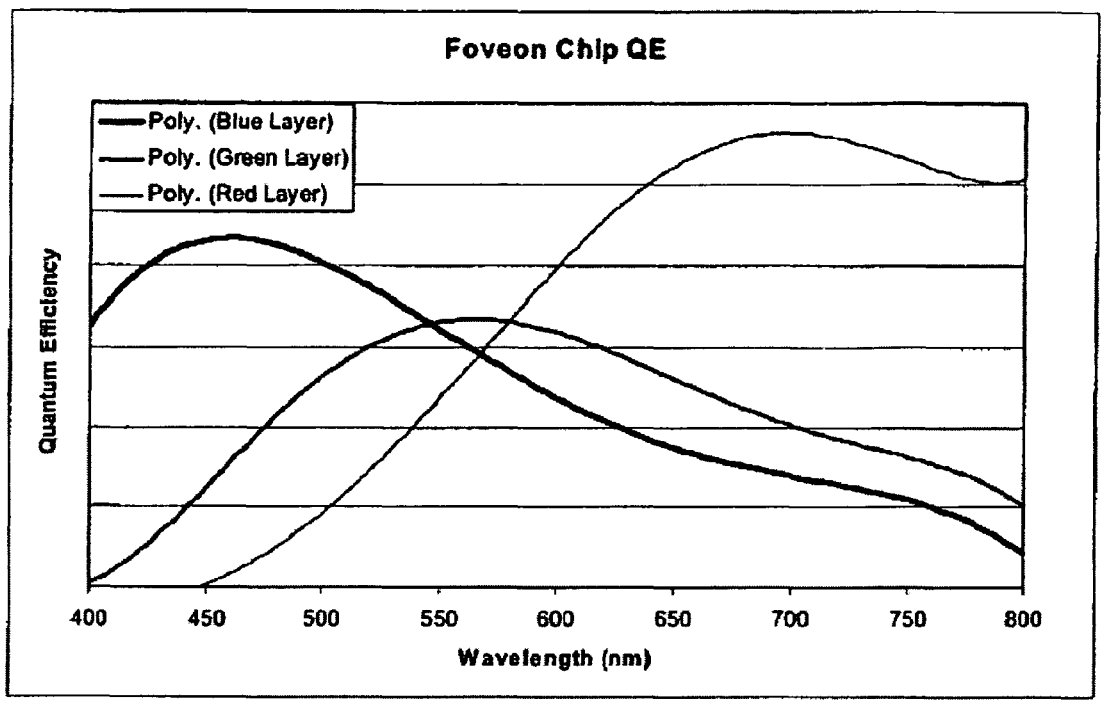
FIG. 5 depicts the performance of each of three bands of a three band detector chip over a range of wavelengths according to the prior art.

FIG. 5 depicts an illustrative graph of the quantum efficiency of each red, green and blue layer of a Foveon chip at wavelengths between 400 nm and 800 nm. Each of the red, green and blue layers respectively has its peak response at wavelengths corresponding to red, green and blue. The quantum efficiency of the red, green and blue layers of a semiconductor detector such as the Foveon chip may be empirically determined and stored in the memory of the camera device or elsewhere in the imaging system. These values, represented by the graph of FIG. 5, may be assigned the labels $R_A$, $R_B$, $R_C$ for the red layer, $G_A$, $G_B$, $G_C$ for the green layer and $B_A$, $B_B$, $B_C$ where A, B and C correspond to the blue, red and green bands associated with the filter applied and the quantum efficiency in those bands.

Figure 6:
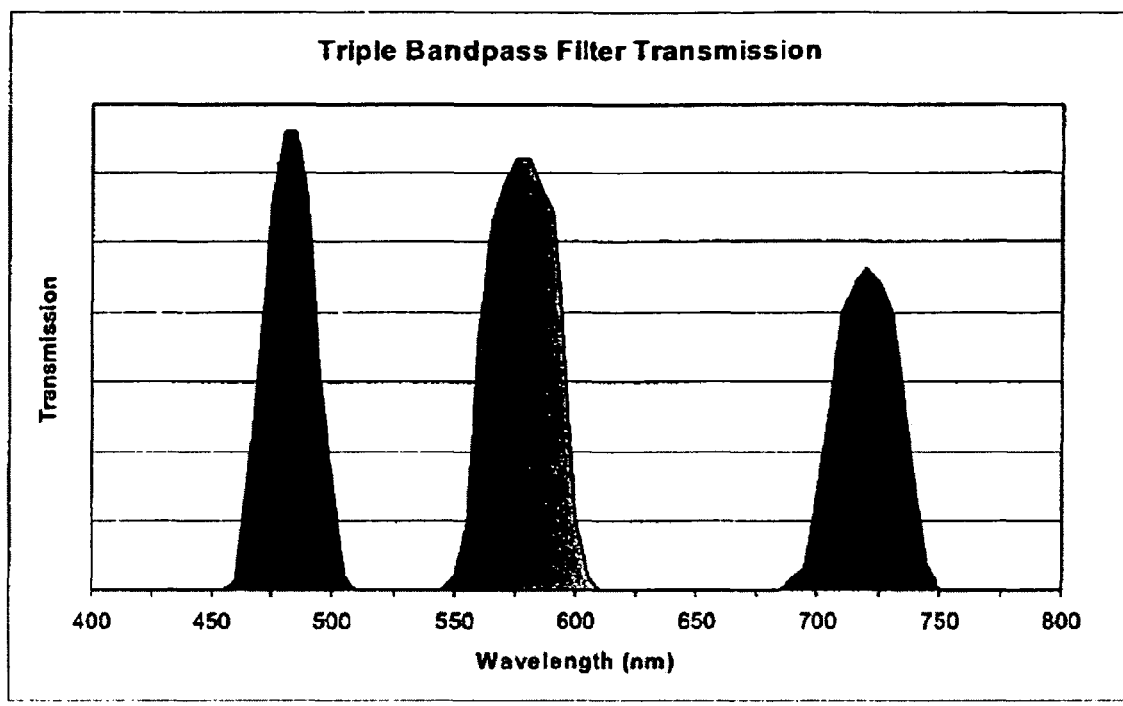
FIG. 6 depicts the transmission characteristics of an illustrative triple bandpass filter that may be implemented in an imaging system according to embodiments of the present invention.

FIG. 6 depicts an illustrative graph of the transmission of light by a triple bandpass filter element. There are three peaks, one for each band that is passed. In this example, the filter passes three bands of light respectively in the blue, green and red wavelength regions. The filter transmits the blue band the most efficiently, the green band the next most efficiently and the red band the least efficiently. These quantities may be represented as $F_A$, $F_B$, $F_C$, where A, B and C are the blue, red and green bands.

Figure 8:
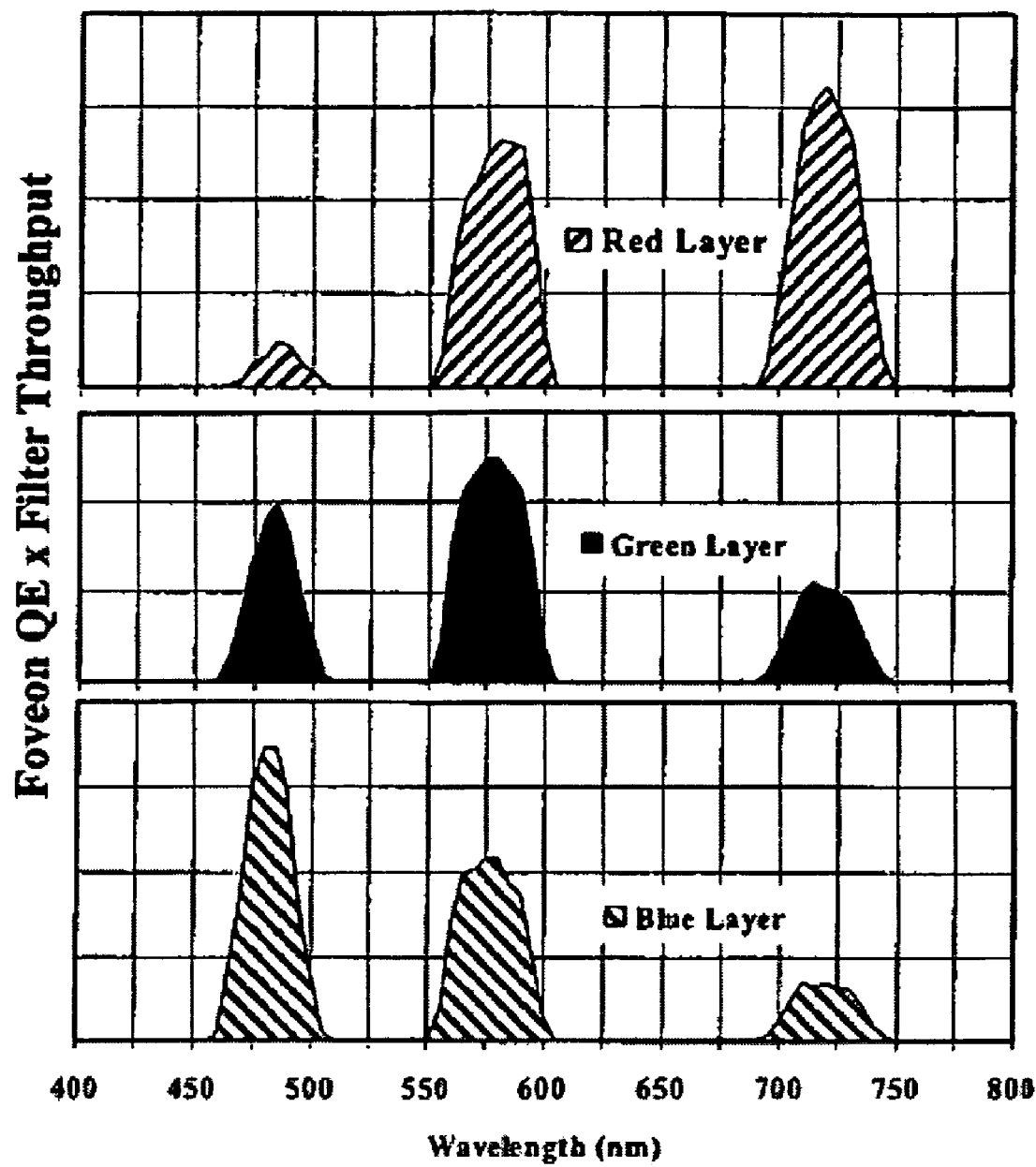
FIG. 8 depicts an illustrative signal output of a filter and detector according to an embodiment of the present invention.

FIG. 8 depicts an illustrative graph of the output of a single camera imaging system having the filter represented graphically by FIG. 5 and the detector represented graphically in terms of its quantum efficiency by the graph of FIG. 6. Each of the layers produces a signal in response to light in all three wavelengths, $S_{red}$, $S_{green}$ and $S_{blue}$. However, the peak response of the red layer is contributed by the radiation in the red band; the peak response of the green layer is contributed by radiation in the green band and the peak response of the blue layer is contributed by radiation in the blue band.

The data discussed above may be used to reconstruct the actual amount of signal in each of the bands defined by the filters. In particular, the following equations may be used to solve for the actual signals received from the target in the three bands represented by the three band filter, $S_A$, $S_B$, $S_C$:

$$Sred = S_A F_A R_A + S_B F_B R_B + S_C F_C R_C$$

$$Sgreen = S_A F_A G_A + S_B F_B G_B + S_C F_C G_C$$

$$Sblue = S_A F_A B_A + S_B F_B B_B + S_C F_C B_C$$

The values $S_A$, $S_B$, $S_C$ represent intensity data associated with the color of each band A, B and C respectively and is a unique value for each pixel, at each pixel location. In systems having a six band filter with alternating three band filter elements A and B, each pixel will be defined by its coordinates and intensity for the three bands corresponding to filter A or B depending on the pixel. In aggregate, the pixel data includes six bands of color data even though each individual pixel only includes three pixels. The pixel data may then be output to the processing unit 150.

The processing unit 150 may be comprise any type of device that may store or make use of use of pixel data, including a general purpose computer system, memory, a database, a detection or classification system, an image processing system or any other system. The pixel data from the camera may be collected and stored, for example, in the processing unit 150 for later analysis or use. Alternatively, the pixel data may be processed immediately by the processing unit 150 for immediate presentation to the user a still or motion picture images. The pixel data generated according to embodiments of the present invention may be processed and rendered using any algorithm, including but not limited to: spectral angle mapping (SAM), minimal noise fraction (MNF), principal component analysis (PCA), spectral matched filtering (SMF), spectral RX. One illustrative example is to form an average image by pixel averaging among adjacent pixels or groups of pixels comprising both filter elements A and filter elements B. Alternatively, rather than an average image, each of the six bands may be accorded a weight that is used to interpolate between adjacent pixels or adjacent groups of pixels comprising filter elements A and filter elements B. Any other technique may be used to sharpen the image and use information from the additional bands to reduce glint, the influence of physical obstacles and other imperfections.

During use, the single camera, multispectral imaging system described herein may be housed within a compact and rugged housing that is capable of being mounted within a vehicle. The higher the degree of integration in the imaging system, the smaller and lighter the imaging system will be. Such systems may be well suited for mounting and operation in a range of vehicles as described above.

While specific embodiments have been shown and described herein, it will be understood that changes may be made to those embodiments without departing from the spirit and scope of the present invention. For example, which a lens has been shown as part of the imaging system between the filter and the detector, it will be understood that in certain implementations a separate lens element between the filter and the detector may not be required. Moreover, while red, green and blue bands have been described, it will be understood that other bands both within and outside of the visual spectrum may be used according to embodiments of the present invention.

What is claimed is:

1. An imaging system, comprising:
a camera comprising a detector having an image plane and photosensing layers beneath the image plane corresponding to different bands that each preferentially detect a different band;
a multi-band, band pass filter for filtering radiation received from a target and optically conveying it to the image plane, the filter including at least some filter elements having more than two bands, wherein the filter elements comprise at least two different types of filter elements, each transmitting different bands to a corresponding spatial region of the image plane and conveying radiation to a pixel region of the image lane;
wherein each of the filter elements conveys filtered radiation having more than two bands to a pixel region of the image plane and wherein the filtered radiation is further detected at each photosensing layer of the detector as the filtered radiation penetrates each layer of the detector in turn from the image plane, resulting in detected signals corresponding to each of the layers.

2. The imaging system according to claim 1, wherein the filter elements of different types are arranged in a checkerboard pattern to comprise the filter.

3. The imaging system according to claim 1, wherein the filter comprises more than four substantially non-overlapping bands.

4. The imaging system according to claim 1, wherein the filter comprises six substantially non-overlapping bands.

5. The imaging system according to claim 1, wherein the filter comprises twelve substantially non-overlapping bands.

6. The imaging system according to claim 2, wherein each of the different types of filter elements comprises a three band filter.

7. The imaging system according to claim 2, wherein the filter comprises four different types of filter elements and each filter element comprises a three band filter.

8. The imaging system according to claim 1, further comprising a lens between the filter and the camera that conveys the image from the filter to the image plane.

9. The imaging system according to claim 8, wherein the lens comprises a lens array.

10. The multi-band, band pass filter according to claim 1, wherein the filter elements comprise multi-layer dielectric filters.

11. The imaging system according to claim 1, further comprising a processing unit for processing the signals output from the camera.

12. The imaging system according to claim 1, wherein the imaging system is mounted in a vehicle.

* * * * *